(12) United States Patent
Ujita

(10) Patent No.: US 10,300,868 B2
(45) Date of Patent: May 28, 2019

(54) GROMMET AND WIRE HARNESS

(71) Applicant: SUMITOMO WIRING SYSTEMS, LTD., Yokkaichi-shi, Mie (JP)

(72) Inventor: Satoshi Ujita, Yokkaichi (JP)

(73) Assignee: SUMITOMO WIRING SYSTEMS, LTD., Yokkaichi-shi, Mie (JP)

( * ) Notice: Subject to any disclaimer, the term of this patent is extended or adjusted under 35 U.S.C. 154(b) by 0 days.

(21) Appl. No.: 15/767,463

(22) PCT Filed: Oct. 17, 2016

(86) PCT No.: PCT/JP2016/080687
§ 371 (c)(1),
(2) Date: Apr. 11, 2018

(87) PCT Pub. No.: WO2017/069084
PCT Pub. Date: Apr. 27, 2017

(65) Prior Publication Data
US 2018/0312119 A1 Nov. 1, 2018

(30) Foreign Application Priority Data

Oct. 19, 2015 (JP) ................................ 2015-205344

(51) Int. Cl.
*H01B 7/00* (2006.01)
*H02G 3/22* (2006.01)
(Continued)

(52) U.S. Cl.
CPC ....... *B60R 16/0222* (2013.01); *H01B 7/0045* (2013.01); *H01B 17/583* (2013.01); *H02G 3/22* (2013.01); *H01B 7/282* (2013.01)

(58) Field of Classification Search
None
See application file for complete search history.

(56) References Cited

U.S. PATENT DOCUMENTS 4,959,509 A * 9/1990 Takeuchi ............... H02G 3/083
174/153 G
5,138,117 A * 8/1992 Oikawa .................. H02G 3/088
16/2.2
(Continued)

FOREIGN PATENT DOCUMENTS

| JP | H07245031 A | 9/1995 |
| JP | H0917261 A | 1/1997 |
| JP | 2012050307 A | 3/2012 |

OTHER PUBLICATIONS

International Preliminary Report on Patentability for Application No. PCT/JP2016/080687 dated Aug. 23, 2017; 10 pages.
(Continued)

*Primary Examiner* — Dimary S Lopez Cruz
*Assistant Examiner* — Muhammed Azam
(74) *Attorney, Agent, or Firm* — Reising Ethington, P.C.

(57) ABSTRACT

A grommet includes: a tapered tube portion that is to be inserted, with an electric wire group W passed therethrough, into a flange from a cabin-outside and attached thereto; and a panel fitting portion that is formed in an outer face portion on a base end side of the tapered tube portion, and is to be fitted to the flange. The fitting portion includes: a ring-shaped groove portion that accommodates a portion on the leading end face side of the flange; an arcuate rib that is formed continuously with a tapered tube outer face portion; a ring-shaped flat face portion that is formed continuously with the arcuate rib; and an auxiliary seal portion that is formed continuously with the ring-shaped flat face portion, and protrudes toward the cabin-inside relative to the ring-shaped flat face portion.

4 Claims, 6 Drawing Sheets

(51) Int. Cl.
*B60R 16/02* (2006.01)
*H01B 17/58* (2006.01)
*H01B 7/282* (2006.01)

(56) References Cited

U.S. PATENT DOCUMENTS

| | | | | |
|---|---|---|---|---|
| 5,270,487 A * | 12/1993 | Sawamura | ............... | H02G 3/22 174/152 G |
| 5,499,823 A * | 3/1996 | Fukui | ................. | B60R 16/0222 16/2.1 |
| 5,701,634 A * | 12/1997 | Uemura | .................... | F16L 5/10 16/2.1 |
| 5,739,475 A * | 4/1998 | Fujisawa | ............. | B60R 16/0222 174/153 G |
| 5,774,934 A * | 7/1998 | Fujita | ................. | B60R 16/0222 16/2.1 |
| 5,856,635 A * | 1/1999 | Fujisawa | ............. | B60R 16/0222 16/2.1 |
| 5,981,877 A * | 11/1999 | Sakata | ................ | B60R 16/0222 174/153 G |
| 6,088,875 A * | 7/2000 | Ono | .................... | B60R 16/0222 16/2.2 |
| 6,088,876 A * | 7/2000 | Daoud | ...................... | F16L 5/10 16/2.2 |
| 6,101,674 A * | 8/2000 | Furuya | ................ | B60R 16/0222 16/2.1 |
| 6,240,597 B1 * | 6/2001 | Mochizuki | .......... | B60R 16/0222 16/2.1 |
| 6,278,060 B1 * | 8/2001 | Mori | .................. | B60R 16/0222 16/2.1 |
| 6,297,457 B1 * | 10/2001 | Yamada | ............... | B60R 16/0222 16/2.1 |
| 6,339,196 B1 * | 1/2002 | Uchida | ............... | B60R 16/0222 16/2.1 |
| 6,353,185 B1 * | 3/2002 | Sakata | .................... | H02G 3/18 16/2.1 |
| 6,372,995 B1 * | 4/2002 | Mochizuki | .......... | B60R 16/0222 174/152 G |
| 6,442,794 B2 * | 9/2002 | Uchida | ............... | B60R 16/0222 16/2.1 |
| 6,495,767 B2 * | 12/2002 | Okuhara | ............ | B60R 16/0222 16/2.1 |
| 7,098,402 B2 * | 8/2006 | Suzuki | ................ | B60R 16/0222 16/2.1 |
| 8,628,093 B2 * | 1/2014 | Suzuki | .................... | H02G 3/22 277/603 |
| 9,425,597 B2 * | 8/2016 | Suzuki | ................ | B60R 16/0222 |
| 2001/0008330 A1 * | 7/2001 | Sakata | ................ | B60R 16/0222 277/316 |
| 2001/0020536 A1 * | 9/2001 | Kondoh | ............... | B60R 16/0222 174/650 |
| 2001/0023773 A1 * | 9/2001 | Nakata | .................... | B60R 13/07 174/668 |
| 2001/0044984 A1 * | 11/2001 | Ono | .................... | B60R 16/0222 16/2.5 |
| 2002/0004967 A1 * | 1/2002 | Saeki | .................. | B60R 16/0222 16/2.1 |
| 2002/0036098 A1 * | 3/2002 | Okuhara | ............. | B60R 16/0222 174/152 G |
| 2003/0062694 A1 * | 4/2003 | Uchida | ............... | B60R 16/0222 277/634 |
| 2004/0206538 A1 * | 10/2004 | Okuhara | ............ | B60R 16/0222 174/650 |
| 2006/0201710 A1 * | 9/2006 | Murakami | .......... | B60R 16/0222 174/652 |

OTHER PUBLICATIONS

International Search Report for Application No. PCT/JP2016/080687 dated Dec. 20, 2016; 5 pages.

* cited by examiner

GROMMET AND WIRE HARNESS

CROSS REFERENCE TO RELATED APPLICATIONS

This application claims the priority of Japanese patent application JP2015-205344 filed on Oct. 19, 2015, the entire contents of which are incorporated herein.

TECHNICAL FIELD

The present invention relates to a grommet and a wire harness that is to be attached to a through-hole in a panel or the like in a vehicle and through which an electric wire group is passed, the grommet and wire harness being made while giving consideration to waterproofability.

BACKGROUND ART

Conventionally, a through-hole is provided in a vehicle body panel such as a dash panel that partitions an engine room from a vehicle cabin in an automobile, and commonly, a wire harness is arranged to span between an engine room and a vehicle cabin through the through-hole. When a wire harness is thus arranged, a grommet is provided between the wire harness and the through-hole in the vehicle body panel to prevent water, dust, or noise from entering from a gap in the through-hole.

A flange is provided in many through-holes in vehicle body panels. For a vehicle body panel that includes a flange, the shape of a grommet needs to be designed while giving consideration to the shape of the flange to ensure waterproofability.

Patent Document 1 (JPH4-249817A) describes an example of a grommet that is to be fitted to a through-hole with a flange provided in a vehicle body panel. A grommet 9 described in Patent Document 1 includes a tapered portion 2 and a fitting portion 3 as shown in FIG. 7A, and the fitting portion 3 includes a first groove portion 4, a second groove portion 6, a ring-shaped protrusion 5, and a collar portion 7. The flange in the panel 8 stands upright.

If this grommet 9 is fitted to the panel 8, the standing portion of the flange presses the ring-shaped protrusion 5 and ensures waterproofability by sealing the grommet 9 at three points, namely points X,Y, and Z in FIG. 7B.

SUMMARY

However, the shapes of flanges include not only a vertically standing shape relative to a panel face such as one described in Patent Document 1, but also an inclined shape. FIG. 8 shows an example in which a grommet is fitted to a panel with such a flange that is inclined relative to a panel face. In the example shown in FIG. 8, since contact faces of the flange and the grommet are inclined, sufficient contact pressure cannot be obtained, and waterproofability is degraded.

The present design has been made to solve the foregoing problem, and aims to provide a grommet capable of increasing waterproof performance in a case where a flange in a vehicle body panel is inclined relative to a panel face, and also provide a wire harness that uses this grommet.

To achieve the above-stated object, a grommet according to the present application is a grommet to be inserted, with an electric wire group passed therethrough, to a flange from a cabin-outside and attached thereto so as to prevent entrance of water, the flange being formed in a partition wall panel for partitioning the cabin-outside and a cabin-inside and having a tapered tubular shape that protrudes from the partition wall panel toward the cabin-inside, the grommet including: a tapered tube portion whose tube diameter gradually increases from a leading end side toward a base end side in an insertion direction; and a fitting portion formed in an outer face portion on the base end side of the tapered tube portion, the fitting portion being to be fitted to the flange, wherein the fitting portion includes: a ring-shaped groove portion that is formed so as to accommodate, when attached to the flange, a portion on a leading end face side of the flange; a tapered tube outer face portion that is formed continuously with the ring-shaped groove portion, and comes, when attached to the flange, into close contact with a portion on a small diameter side of a reference tapered tube face that coincides with a tapered tube inner face portion of the flange; a first seal portion that is formed continuously with the tapered tube outer face portion, has linear sides in portions on both sides of a remainder portion of the reference tapered tube face, has a center portion having an arcuate cross-sectional shape that protrudes outward, and is pressed, when attached to the flange, by the tapered tube inner face portion of the flange and comes into close contact therewith; a ring-shaped flat face portion that is formed continuously with the first seal portion, and faces, when attached to the flange, the partition wall panel while surrounding an outer side of the flange; and a second seal portion that is formed continuously with an outer circumferential end of the ring-shaped flat face portion, and protrudes toward the cabin-inside relative to the ring-shaped flat face portion, while forming a ring shape that surrounds the ring-shaped flat face portion, the ring-shaped groove portion is configured so that, when accommodating the portion on the leading end face side of the flange, the portion on the leading end face side of the flange enters a state of biting into the ring-shaped groove portion in a leading end direction, and the first seal portion is deformed, when attached to the flange, to enter the state of biting while pushing up the tapered tube inner face portion in a direction perpendicular to the reference tapered tube face by means of a reaction force exerted against the center portion being pressed by the tapered tube inner face portion of the flange.

With this configuration, the ring-shaped flat face portion accommodates the portion on the leading end side of the flange so that portion on the leading end side of the flange bites into the ring-shaped groove portion in the leading end direction. The tapered tube outer face portion comes into close contact with the tapered tube inner face portion of the flange. The first seal portion is pressed and deformed by the flange, and comes into close contact with the tapered tube inner face portion of the flange. The second seal portion comes into firm, close contact with the partition wall at a position surrounding the ring-shaped flat face portion, with the first seal portion being pressed and deformed by the flange.

Accordingly, the ring-shaped groove portion, the tapered tube outer face portion, the first seal portion, and the second seal portion come into close contact with the flange and are fitted thereto, and the fitting portion can ensure contact pressure. Thus, waterproofability can be improved in a case where the flange in the partition wall panel is inclined relative to the partition wall panel face.

In the grommet according to the present application, the ring-shaped groove portion may be configured so that, when accommodating the portion on the leading end face side of the flange, the portion on the leading end face side of the flange enters a state of biting into the ring-shaped groove portion in a leading end direction.

With this configuration, when the portion on the leading end face side of the flange is accommodated in the ring-shaped groove portion, the portion on the leading end face side of the flange bites into the ring-shaped groove portion in the leading end direction, the contact force between the flange and the grommet increases, and waterproofability can be improved.

In the grommet according to the present application, a height from the ring-shaped flat face portion to a lower end of the tapered tube portion may be set to be smaller than a height of the flange in a vertical direction so as to cause the state of biting.

With this configuration, upon the grommet being attached to the partition wall panel, the flange bites into the grommet and a force acts in the vertical direction. Accordingly, it is possible to increase the contact force of the grommet and improve waterproofability.

In the grommet according to the present application, an inner radius of the flange at an upper end of the tapered tube inner face portion may be set to be smaller than a smallest inner radius of the ring-shaped groove portion so as to cause the state of biting.

With this configuration, upon the grommet being attached to the partition wall panel, the flange bites into the grommet, and a force acts in the horizontal direction. Accordingly, it is possible to increase the contact force of the grommet and improve waterproofability.

A wire harness according to the present application includes: an electric wire group; and any of the above-describe grommets, wherein the electric wire group is passed through the grommet, and the electric wire group and the grommet are joined and fixed to each other by a tape fixing portion formed by winding an adhesive tape on a leading end side of the grommet.

With this configuration, in the wire harness according to the present application, the electric wire group is passed through the grommet, and the electric wire group and the grommet are joined and fixed to each other by the tape fixing portion that is formed by winding an adhesive tape on the leading end side of the grommet. For this reason, if, after the grommet is attached, an external force that acts from the center of the grommet toward a side is continuously exerted on the electric wire group that is passed through the grommet, the leading end side of the grommet is deformed toward the side toward which the grommet is pulled by the external force.

In this case, the grommet enters, on the side opposite to the deformed side, a state where the portion on the leading end face side of the flange bites less into the ring-shaped groove portion, but the state of close contact is not canceled. The first seal portion is barely deformed, and the state of being in firm, close contact with the tapered tube inner face portion of the flange is maintained. For this reason, even if the second seal portion is in weak contact with a face on the cabin-outside of the partition wall panel, and water reaches the ring-shaped flat face portion from a gap therebetween, this water does not reach the cabin-inside of the partition wall panel through the first seal portion, and thus, waterproofability can be improved.

According to the present application, the waterproofability can be improved in a case where a flange in a vehicle body panel is inclined relative to a panel face.

DESCRIPTION OF EMBODIMENTS

Hereinafter, an embodiment of a grommet and a wire harness according to the present application will be described with reference to the drawings.

Figure 1:
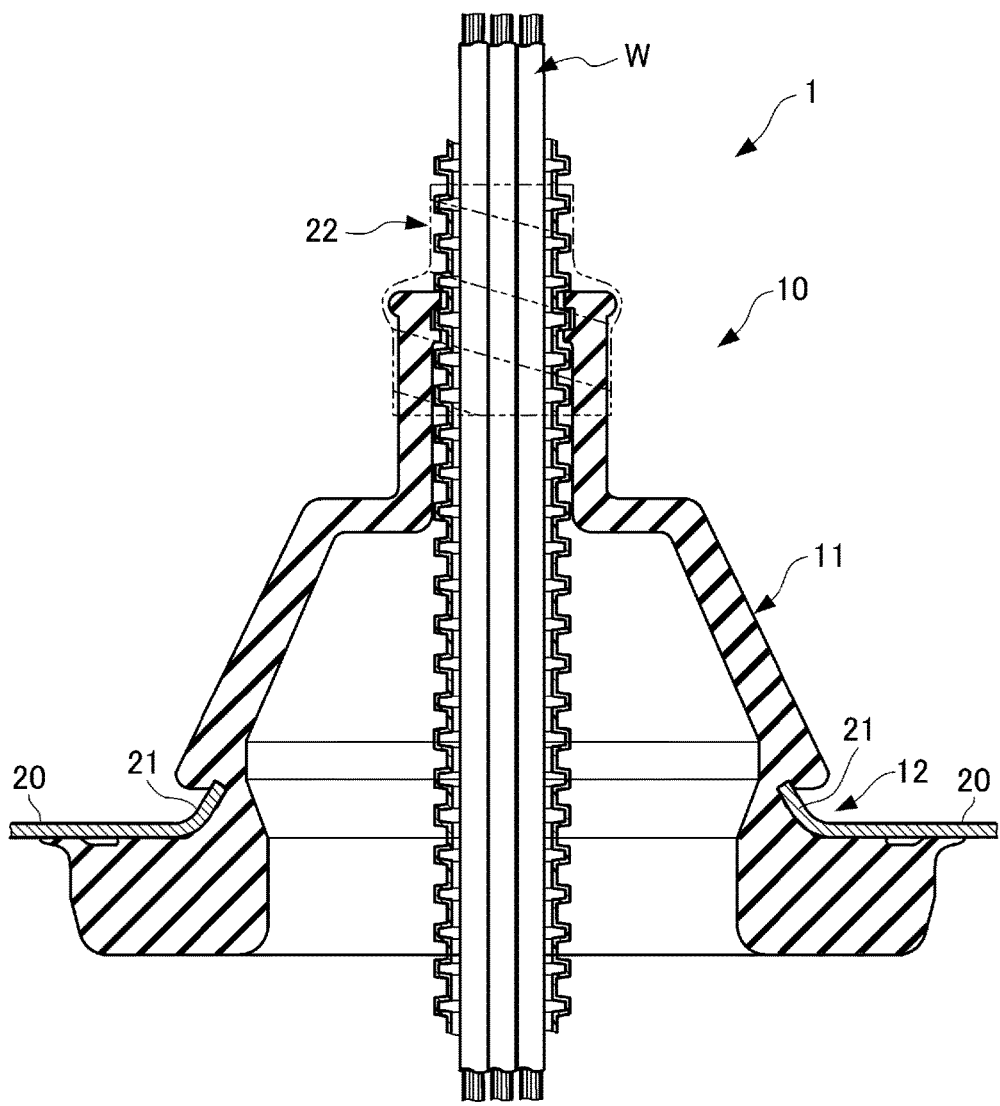
FIG. 1 is a vertical cross-sectional view showing a configuration of a wire harness and a grommet according to an embodiment.

FIG. 1 is a vertical cross-sectional view showing the grommet and the wire harness according to this embodiment. As shown in FIG. 1, a wire harness 1 includes an electric wire group W and a grommet 10. The wire harness 1 is fitted to a vehicle body panel 20, which partitions the cabin-inside and cabin-outside of a vehicle body, via the grommet 10.

The electric wire group W is constituted by a plurality of electric wires, and is passed through the inside of the grommet 10 from the cabin-inside toward the cabin-outside of the vehicle body. The electric wire group W and the grommet 10 are joined and fixed to each other by winding an adhesive tape around a tape fixing portion 22 provided on a leading end side of the grommet 10. Note that, in FIG. 1, the side upward of the vehicle body panel is referred to as cabin-inside, and the side downward thereof is referred to as cabin-outside. The lower side of the grommet is referred to as a base end side, and the upper side thereof is referred to as a leading end side.

Figure 6:
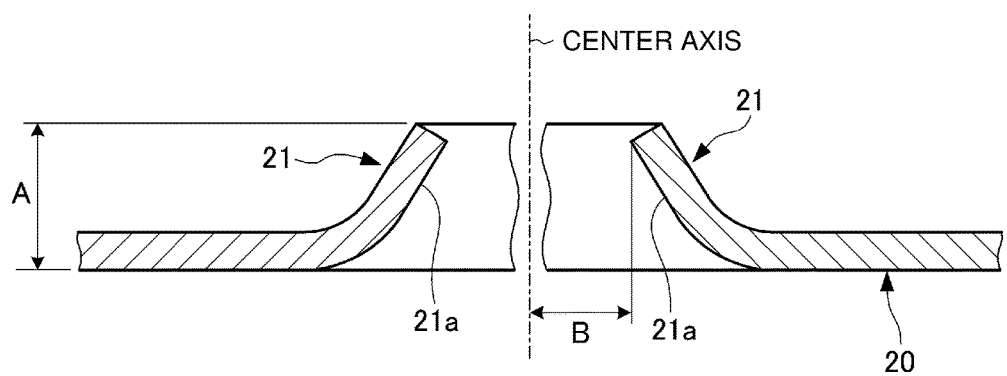
FIG. 6 is a cross-sectional view showing the vehicle body panel to which the grommet is to be fitted according to an embodiment.
Figure 7A:
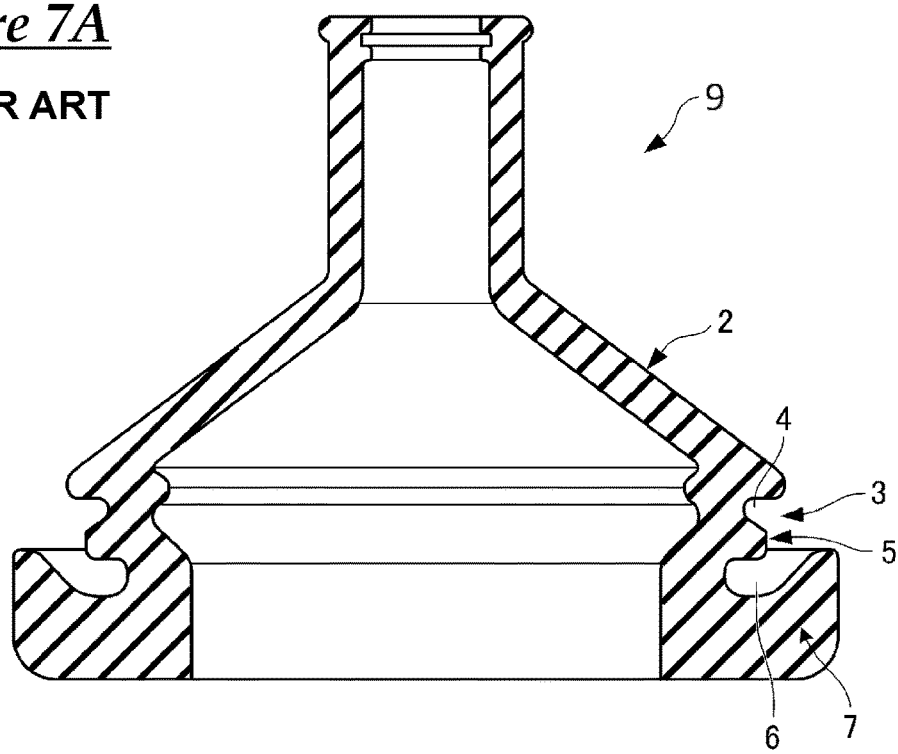
FIG. 7A is a vertical cross-sectional view showing an example of a conventional grommet used in a wire harness.
Figure 7B:
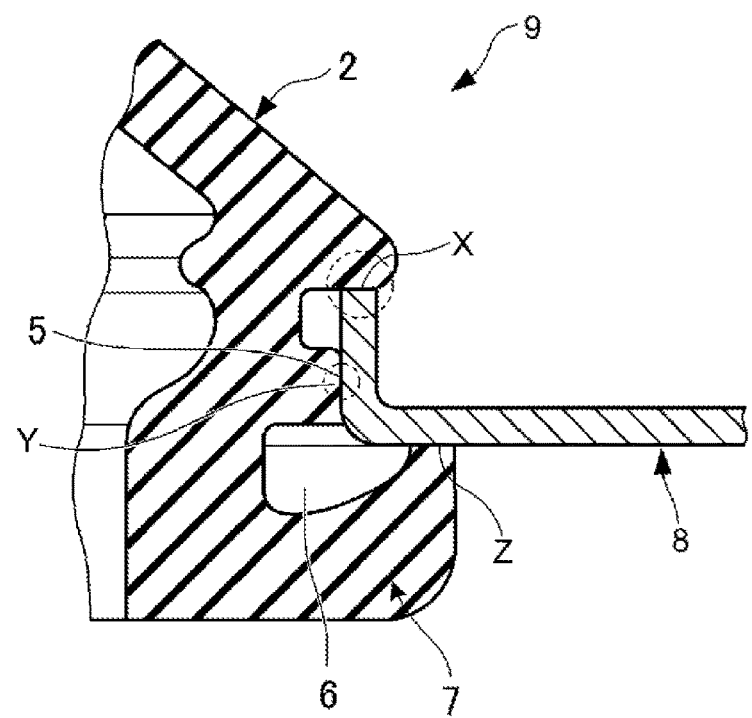
FIG. 7B is a vertical cross-sectional view showing an example of a conventional grommet used in a wire harness.
Figure 8:
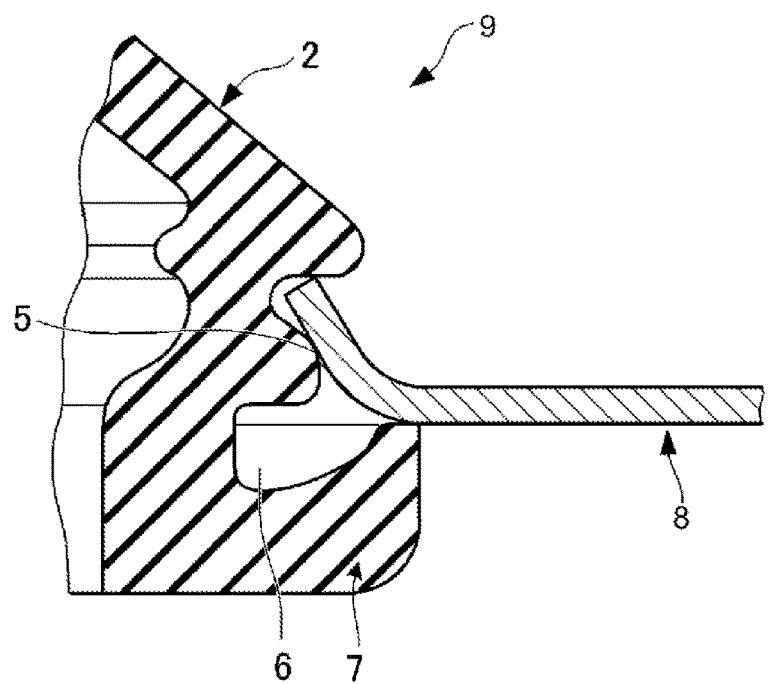
FIG. 8 is a vertical cross-sectional view showing an example in which the conventional grommet used in a wire harness is fitted to a vehicle body panel.

As shown in FIG. 6, a through-hole through which the wire harness 1 is passed is provided in the vehicle body panel 20, and a flange 21 is formed around the through-hole. The flange 21 has a tapered tubular shape that protrudes toward the cabin-inside from the vehicle body panel 20 and is inclined toward the center of the through-hole.

The height of the flange 21 in the vertical direction is A, and is set to be greater than the height A' from a later-described ring-shaped flat face portion 16 to a lower end of a tapered tube portion 11. The inner radius of the flange 21 at an upper end of a tapered tube inner face portion 21a is B, and is set to be smaller than the smallest inner radius B' of a later-described ring-shaped groove portion 13. This is for causing a state where a portion on the leading end face side of the flange 21 bites into a panel fitting portion 12 when attached to the flange 21 so that the contact force between the flange 21 and the grommet 10 is increased.

In this embodiment, the inclination of the tapered tubular shape of the flange 21 is about 60 degrees relative to the vehicle body panel 20, but is not necessarily limited to this angle. For example, the inclination angle may also be a different angle, e.g. 45 degrees. The flange 21 is to be fitted to the later-described panel fitting portion 12 of the grommet 10.

Figure 2:
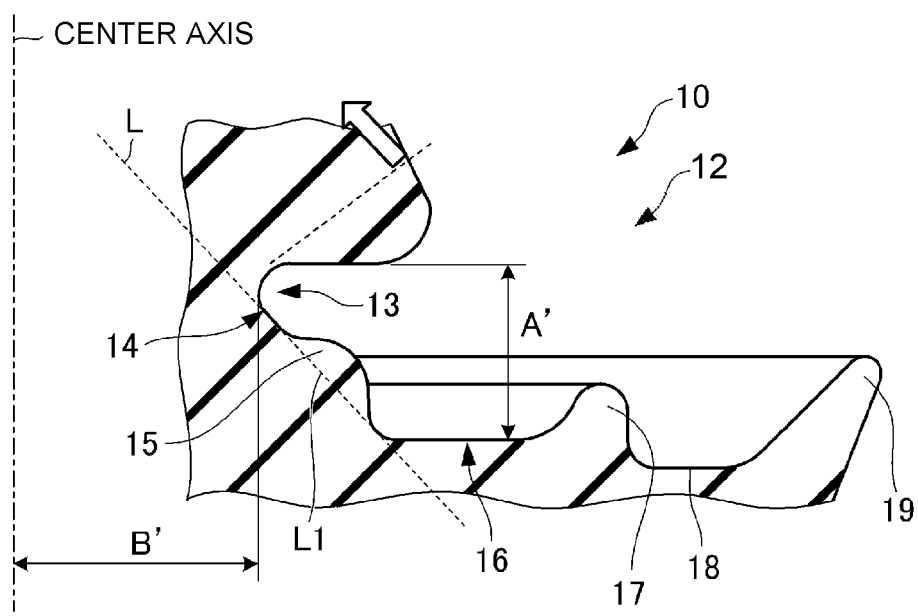
FIG. 2 is a partial cross-sectional view showing a fitting portion before the grommet according to an embodiment is fitted to a vehicle body panel.

Next, a region around the panel fitting portion 12 of the grommet 10 will be described using FIGS. 2 to 5. FIG. 2 shows a state before the grommet 10 is fitted to the vehicle body panel 20. The grommet 10 includes the tapered tube portion 11 and the panel fitting portion 12. The grommet 10, with the electric wire group W passed therethrough, is attached to the flange 21 while being inserted from the cabin-outside, and blocks water so as to prevent moisture or the like from entering from the vehicle body outside. The grommet 10 is made of a flexible material, such as rubber.

The tube diameter of the tapered tube portion 11 gradually expands from the leading end side toward the base end side in the direction in which the electric wire group W is inserted thereinto. This shape facilitates the insertion of the grommet 10 into the vehicle body panel 20.

Figure 3:
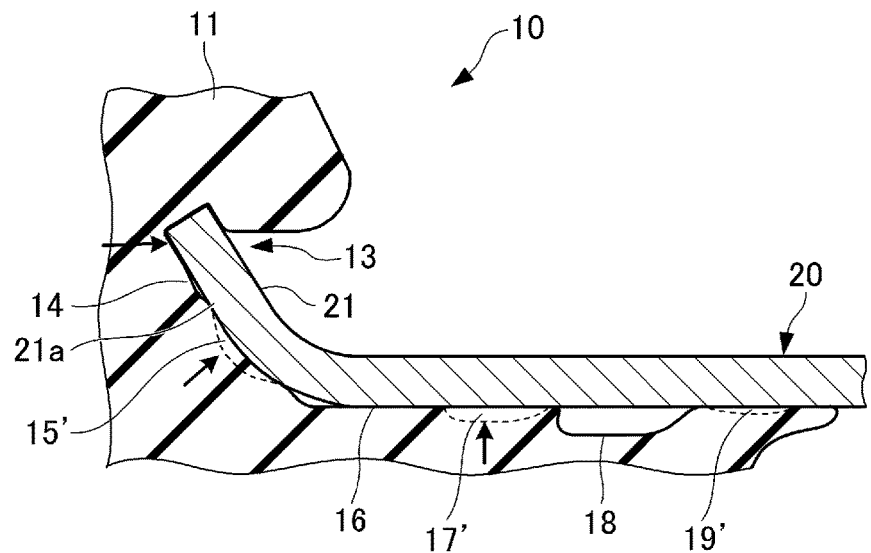
FIG. 3 is a partial cross-sectional view showing details of the fitting portion before the grommet according to an embodiment is fitted to the vehicle body panel.

The panel fitting portion 12 includes a ring-shaped groove portion 13, a tapered tube outer face portion 14, an arcuate rib 15, a ring-shaped flat face portion 16, an auxiliary seal portion 17, an outer ring-shaped flat face portion 18, and an outer auxiliary seal portion 19. The panel fitting portion 12 is formed in an outer face portion on the base end side of the tapered tube portion 11, and is to be fitted to the flange 21, as shown in FIG. 3. The panel fitting portion 12 constitutes a fitting portion according to the present invention, and the auxiliary seal portion 17 constitutes a second seal portion according to the present invention.

The ring-shaped groove portion 13 is a ring-shaped, groove-like space that is formed so as to accommodate, when attached to the flange 21, a portion on the leading end face side of the flange 21 so that the portion on the leading end face side of the flange 21 bites into the ring-shaped groove portion 13 in a leading end direction, i.e. toward the leading end of the tapered tube portion 11 of the grommet 10. The ring-shaped groove portion 13 is configured so that, when accommodating the portion on the leading end face side of the flange 21, the portion on the leading end face side of the flange 21 bites into the ring-shaped groove portion 13 in the leading end direction. That is to say, the grommet 10 is configured so that, when attached to the vehicle body panel 20, the flange 21 enters a state of biting into the grommet 10 in the leading end direction. The ring-shaped groove portion 13 has its smallest inner radius B' at the position at which the inner radius is smallest.

Thus, as a result of the flange 21 biting into the tapered tube portion 11, the grommet 10 comes into close contact with the flange 21. Accordingly, the close contact area prevents water or the like from entering, and the waterproofability is thus improved. Here, "state of biting" refers to a state where the portion on the leading end face side of the flange 21 bites into the grommet 10 in the direction toward the leading end of the tapered tube portion 11 by several millimeters, as shown in FIG. 4.

The tapered tube outer face portion 14 is formed continuously with the ring-shaped groove portion 13, and comes, when attached to the flange 21, into close contact with a portion on a small diameter side of a reference tapered tube face L, which coincides with the tapered tube inner face portion 21a.

Figure 4:
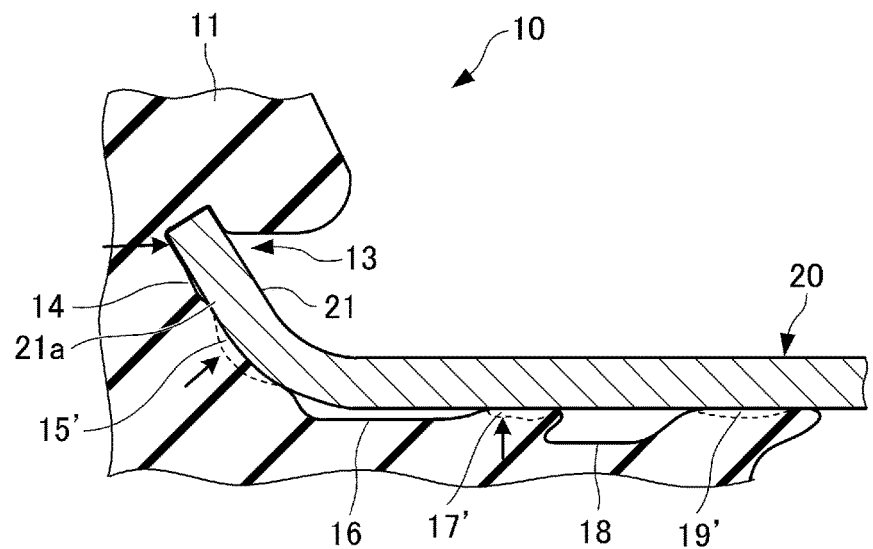
FIG. 4 is a partial cross-sectional view showing the fitting portion after the grommet according to an embodiment is fitted to the vehicle body panel.
Figure 5:
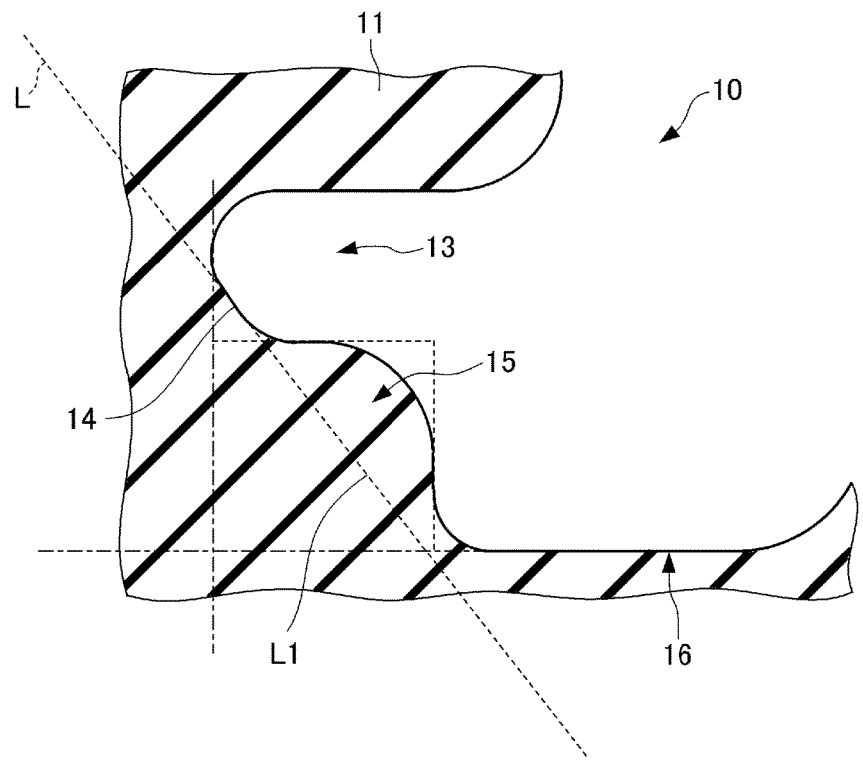
FIG. 5 is a partial cross-sectional view showing a modification of the fitting portion after the grommet according to an embodiment is fitted to the vehicle body panel.

Here, the reference tapered tube face L refers to a face that is formed with a group of lines connecting both ends of an arcuate rib 15', which is the arcuate rib 15 in a deformed state, as shown in FIG. 4. In this embodiment, the reference tapered tube face L is inclined by about 60 degrees in a direction toward the center of the grommet 10 relative to the vehicle body panel 20. This angle of about 60 degrees is set in accordance with the inclination angle of the flange 21 so as to facilitate close contact between the arcuate rib 15 and the flange 21, and may also be changed in accordance with a change in the inclination angle of the flange 21. "Small diameter side" refers to the side on which the diameter of the ring-shaped grommet 10 decreases, i.e. the upper side in the diagrams.

The tapered tube outer face portion 14, which is located on the reference tapered tube face L, is inclined by about 60 degrees relative to the vehicle body panel 20, similarly to the reference tapered tube face L, and has the same inclination angle as that of the flange 21. However, the inclination angle of the tapered tube outer face portion 14 may also be changed in accordance with the inclination angle of the flange 21.

The arcuate rib 15 is formed continuously with the tapered tube outer face portion 14, has linear sides in portions on both sides of a remainder portion L1 of the reference tapered tube face L before being attached to the flange 21 shown in FIG. 2, and has a center portion with an arcuate cross-sectional shape that protrudes outward. Here, the remainder portion L1 refers to a face of the reference tapered tube face L shown in FIG. 2 that intersects the arcuate rib 15 before being attached to the flange 21.

The arcuate rib 15, when attached to the flange 21 shown in FIG. 3, is pressed and deformed in a direction perpendicular to the reference tapered tube face L by the tapered tube inner face portion 21a of the flange 21, and comes into close contact therewith. Since a force from the arcuate rib 15 that presses the flange 21 in the direction perpendicular to the reference tapered tube face L is exerted on this close contact area, the contact force is large and prevents the entrance of water or the like to improve waterproofability. The arcuate rib 15 constitutes a first seal portion according to the present invention.

The ring-shaped flat face portion 16 is formed continuously with the arcuate rib 15, and is a ring-shaped flat face that surrounds, when attached to the flange 21, the outer side of the flange 21 to face the vehicle body panel 20, and comes, when attached to the flange 21, into close contact with a face on the cabin-outside of the vehicle body panel 20. The height from the ring-shaped flat face portion 16 to the lower end of the tapered tube portion 11 is A'.

Although this embodiment employs a configuration in which the ring-shaped flat face portion comes into close contact with the vehicle body panel 20, a configuration in which a gap is formed may also be employed as shown in FIG. 4. This is because the grommet 10, and the flange 21 as well as the vehicle body panel 20 sufficiently come into close contact with each other and achieve a waterproofing effect at the ring-shaped groove portion 13, the arcuate rib 15, and the auxiliary seal portion 17.

The auxiliary seal portion 17 is formed continuously with an outer circumferential end of the ring-shaped flat face portion 16, and protrudes toward the cabin-inside relative to the ring-shaped flat face portion 16, while forming a ring shape that surrounds the ring-shaped flat face portion 16. When the grommet 10 is attached to the vehicle body panel 20, the auxiliary seal portion 17 is pressed and deformed downward by the vehicle body panel 20, and comes into close contact therewith.

The outer ring-shaped flat face portion 18 is formed continuously with the outer side of the auxiliary seal portion 17, and constitutes a horizontal, ring-shaped flat face. In this embodiment, the height of the outer ring-shaped flat face portion 18 is lower than the height of the ring-shaped flat face portion 16. In a state where the grommet 10 is attached to the vehicle body panel 20 as shown in FIG. 3, the outer ring-shaped flat face portion 18 and the vehicle body panel 20 do not come into contact with each other, and a predetermined gap is formed therebetween. However, a configuration may also be employed in which the height of the outer ring-shaped flat face portion 18 is the same as the height of the ring-shaped flat face portion 16 so that the outer ring-shaped flat face portion 18 and the vehicle body panel 20 come into close contact with each other when attached.

The outer auxiliary seal portion 19 is formed continuously with the outer side of the outer ring-shaped flat face portion 18, and protrudes toward the cabin-inside relative to the outer ring-shaped flat face portion 18, while forming a ring shape that surrounds the outer ring-shaped flat face portion 18 at an outer circumferential end of the outer ring-shaped flat face portion 18. When the grommet 10 is attached to the vehicle body panel 20, the outer auxiliary seal portion 19 is pressed and deformed downward by the vehicle body panel 20, and comes into close contact therewith.

Although, in this embodiment, one outer ring-shaped flat face portion 18 and one outer auxiliary seal portion 19 are formed on the outer side of the auxiliary seal portion 17, a plurality of pairs of outer ring-shaped flat face portions 18 and outer auxiliary seal portions 19 may also be formed.

Next, effects of the force that is exerted when the grommet 10 is attached to the vehicle body panel 20 will be described using FIG. 3. The height A' from the ring-shaped flat face portion 16 to the lower end of the tapered tube portion 11 of the grommet 10 is smaller than the height A of the flange 21 in the vertical direction. For this reason, to attach the grommet 10 to the vehicle body panel 20, first, the vehicle body panel 20 presses and deforms the arcuate rib 15 in a direction perpendicular to the direction in which the flange 21 is inclined, and presses and deforms the auxiliary seal portion 17 and the outer auxiliary seal portion 19 downward.

The arcuate rib 15 deforms to the position of the reference tapered tube face L, and becomes the arcuate rib 15' as denoted by a dotted line in the diagrams. The auxiliary seal portion 17 and the outer auxiliary seal portion 19 deform to the height of the ring-shaped flat face portion 16, and become an auxiliary seal portion 17' and an outer auxiliary seal portion 19', respectively, as denoted by dotted lines in the diagrams.

Also, since the inner radius B of the flange 21 at the upper end of the tapered tube inner face portion 21a is smaller than the smallest inner radius B' of the ring-shaped groove portion 13, the leading end portion of the flange 21 bites into the ring-shaped groove portion 13 of the grommet 10 to deform the grommet 10 when attached.

After the grommet 10 is attached to the vehicle body panel 20, the auxiliary seal portion 17, the outer auxiliary seal portion 19, the tapered tube portion 11, and the ring-shaped groove portion 13 of the grommet 10 exert a reaction force on the vehicle body panel 20 in directions denoted by arrows in the diagrams. Since the reaction force contains components in both the horizontal direction and the vertical direction, a force that brings the grommet 10 into close contact with the vehicle body panel 20 in both the horizontal direction and the vertical direction is exerted on the grommet 10.

Accordingly, the grommet 10 can maintain close contact with the vehicle body panel 20 against the external force applied from multiple directions. For example, the grommet 10 can stably maintain close contact and realizes favorable waterproofability, compared with a configuration in which a force that causes close contact therebetween only in the horizontal direction is applied.

As described above, the grommet 10 according to this embodiment includes: the tapered tube portion 11 that is to be inserted, with the electric wire group W passed therethrough, into the flange 21 from the cabin-outside and attached thereto so as to prevent the entrance of water, the tube diameter of the tapered tube portion 11 gradually increasing from the leading end side toward the base end side in the insertion direction, the flange 21 being formed in the vehicle body panel 20 for partitioning the cabin-outside and cabin-inside, and having a tapered tubular shape that protrudes from the vehicle body panel 20 toward the cabin-inside; and a panel fitting portion 12 that is formed in an outer face portion on the base end side of the tapered tube portion 11 and is to be fitted to the flange 21.

The fitting portion 12 includes: the ring-shaped groove portion 13 that is formed so as to accommodate, when attached to the flange 21, the portion on the leading end face side of the flange 21 so that the portion on the leading end face side of the flange 21 bites into the ring-shaped groove portion 13 in the leading end direction; the tapered tube outer face portion 14 that is formed continuously with the ring-shaped groove portion 13, and comes, when attached to the flange 21, into close contact with a portion on the small diameter side of the reference tapered tube face L, which coincides with the tapered tube inner face portion 21a of the flange 21; an arcuate rib 15 that is formed continuously with the tapered tube outer face portion 14, has linear sides in portions on both sides of the remainder portion L1 of the reference tapered tube face L, has a center portion with an arcuate cross-sectional shape that protrudes outward, the arcuate rib 15 being pressed, when attached to the flange 21, by the tapered tube inner face portion 21a of the flange 21 and coming into close contact therewith; the ring-shaped flat face portion 16 that is formed continuously with the arcuate rib 15, and is to face, when attached to the flange 21, the vehicle body panel 20 while surrounding the outer side of the flange 21; and the auxiliary seal portion 17 that is formed continuously with an outer circumferential end of the ring-shaped flat face portion 16, and protrudes toward the cabin-inside relative to the ring-shaped flat face portion 16, while forming a ring shape that surrounds the ring-shaped flat face portion 16.

With this configuration, the ring-shaped groove portion 13 accommodates the portion on the leading end face side of the flange 21 so that the portion on the leading end face side of the flange 21 bites into the ring-shaped groove portion 13 in the leading end direction. The tapered tube outer face portion 14 comes into close contact with the tapered tube inner face portion 21a of the flange 21. The arcuate rib 15 is pressed against the flange 21, undergoes deformation, and comes into close contact with the tapered tube inner face portion 21a of the flange 21. The ring-shaped flat face portion 16 comes into contact with the face on the cabin-outside of the vehicle body panel 20. The auxiliary seal portion 17 comes into firm, close contact with the vehicle body panel 20 at a position surrounding the ring-shaped flat face portion 16, with the arcuate rib 15 pressed against the flange 21 and deformed.

Accordingly, the ring-shaped groove portion 13, the tapered tube outer face portion 14, the arcuate rib 15, the ring-shaped flat face portion 16, and the auxiliary seal portion 17 come into close contact with the flange 21 and are fitted thereto, and the panel fitting portion 12 can ensure contact pressure. Thus, the waterproofability can be improved in a case where the flange 21 in the vehicle body panel 20 is inclined relative to the face of the vehicle body panel 20.

When the portion on the leading end face side of the flange 21 is accommodated in the ring-shaped groove portion, the portion on the leading end face side of the flange 21 bites into the ring-shaped groove portion 13 in the leading end direction. With this configuration, the contact force between the flange 21 and the grommet 10 increases, and the waterproofability can be improved.

The height from the ring-shaped flat face portion 16 to the lower end of the tapered tube portion 11 may also be set to be smaller than the height of the flange 21 in the vertical direction.

With this configuration, upon the grommet 10 being attached to the vehicle body panel 20, the flange 21 bites into the grommet 10, and a force acts in the vertical direction. Thus, it is possible to increase the contact force of the grommet 10, and improve the waterproofability.

The inner radius of the flange 21 at the upper end of the tapered tube inner face portion 21a may also be set to be smaller than the smallest inner radius of the ring-shaped groove portion 13.

With this configuration, upon the grommet 10 being attached to the vehicle body panel 20, the flange 21 bites into the grommet 10, and a force acts in the horizontal direction. Thus, it is possible to increase the contact force of the grommet 10, and improve the waterproofability.

The wire harness 1 according to this embodiment includes the electric wire group W and the grommet 10, and has a configuration in which the electric wire group W is passed through the grommet 10, and the electric wire group W and the grommet 10 are joined and fixed to each other by the tape fixing portion 22 that is formed by winding an adhesive tape on the leading end side of the grommet 10.

With this configuration, since, in the wire harness 1, the electric wire group W is passed through the grommet 10, and the electric wire group W and the grommet 10 are joined and fixed to each other by the tape fixing portion 22 that is formed by winding an adhesive tape on the leading end side of the grommet 10, if, after the grommet 10 is attached, an external force that acts from the center of the grommet 10 toward a side is continuously exerted on the electric wire group W that is passed through the grommet 10, the base end side of the grommet 10 deforms toward the side toward which the grommet 10 is pulled by the external force.

In this case, the grommet 10 enters, on the side opposite to the deformed side, a state where the portion on the leading end face side of the flange 21 bites less into the ring-shaped groove portion 13, but the state of close contact is not canceled. The arcuate rib 15 barely deforms, and the state of being in firm, close contact with the tapered tube inner face portion 21a of the flange 21 is maintained. For this reason, even if the auxiliary seal portion 17 is in weak contact with the face on the cabin-outside of the vehicle body panel 20, and water reaches the ring-shaped flat face portion from a gap therebetween, this water does not reach the cabin-inside of the vehicle body panel 20 via the arcuate rib 15, and the waterproofability can be improved.

The present design is able to provide a grommet capable of improving waterproofability in a case where a flange in a vehicle body panel is inclined relative to a panel face, and a wire harness that uses this grommet. The present design is applicable to general grommets and wire harnesses.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

1 Wire harness
10 Grommet
11 Tapered tube portion
12 Panel fitting portion (fitting portion)
13 Ring-shaped groove portion
14 Tapered tube outer face portion
15 Arcuate rib (first seal portion)
16 Ring-shaped flat face portion
17 Auxiliary seal portion (second seal portion)
20 Vehicle body panel (partition wall panel)
21 Flange
21a Tapered tube inner face portion
22 Tape fixing portion
L Reference tapered tube face
L1 Remainder portion
W Electric wire group

The invention claimed is:
1. A grommet to be inserted, with an electric wire group passed therethrough, to a flange from a cabin-outside and attached thereto so as to prevent entrance of water, the flange being formed in a partition wall panel for partitioning the cabin-outside and a cabin-inside and having a tapered tubular shape that protrudes from the partition wall panel toward the cabin-inside, the grommet comprising:
a tapered tube portion whose tube diameter gradually increases from a leading end side toward a base end side in an insertion direction; and
a fitting portion formed in an outer face portion on the base end side of the tapered tube portion, the fitting portion being to be fitted to the flange,
wherein the fitting portion includes:
a ring-shaped groove portion that is formed so as to accommodate, when attached to the flange, a portion on a leading end face side of the flange;
a tapered tube outer face portion that is formed continuously with the ring-shaped groove portion, and comes, when attached to the flange, into close contact with a portion on a small diameter side of a reference tapered tube face that coincides with a tapered tube inner face portion of the flange, wherein the reference tapered tube face is inclined at an angle in accordance with an inclination angle of the flange;

a first seal portion that is formed continuously with the tapered tube outer face portion, has linear sides in portions on both sides of a remainder portion of the reference tapered tube face, has a center portion having an arcuate cross-sectional shape that protrudes outward, and is pressed, when attached to the flange, by the tapered tube inner face portion of the flange and comes into close contact therewith;

a ring-shaped flat face portion that is formed continuously with the first seal portion, and faces, when attached to the flange, the partition wall panel while surrounding an outer side of the flange; and a second seal portion that is formed continuously with an outer circumferential end of the ring-shaped flat face portion, and protrudes toward the cabin-inside relative to the ring-shaped flat face portion, while forming a ring shape that surrounds the ring-shaped flat face portion, the ring-shaped groove portion is configured so that, when accommodating the portion on the leading end face side of the flange, the portion on the leading end face side of the flange enters a state of biting into the ring-shaped groove portion in a leading end direction, and the first seal portion is deformed, when attached to the flange, to enter the state of biting while pushing up the tapered tube inner face portion in a direction perpendicular to the reference tapered tube face by means of a reaction force exerted against the center portion being pressed by the tapered tube inner face portion of the flange.

2. A wire harness comprising:

an electric wire group; and the grommet according to claim 1, wherein the electric wire group is passed through the grommet, and the electric wire group and the grommet are joined and fixed to each other by a tape fixing portion formed by winding an adhesive tape on a leading end side of the grommet.

3. The grommet according to claim 1, wherein a height from the ring-shaped flat face portion to a lower end of the tapered tube portion is set to be smaller than a height of the flange in a vertical direction so as to cause the state of biting.

4. The grommet according to claim 1, wherein an inner radius of the flange at an upper end of the tapered tube inner face portion is set to be smaller than a smallest inner radius of the ring-shaped groove portion so as to cause the state of biting.

* * * * *